Jan. 27, 1931. C. L. DEWEY 1,790,498
TACKLE BOX
Filed Aug. 27, 1927 2 Sheets-Sheet 1
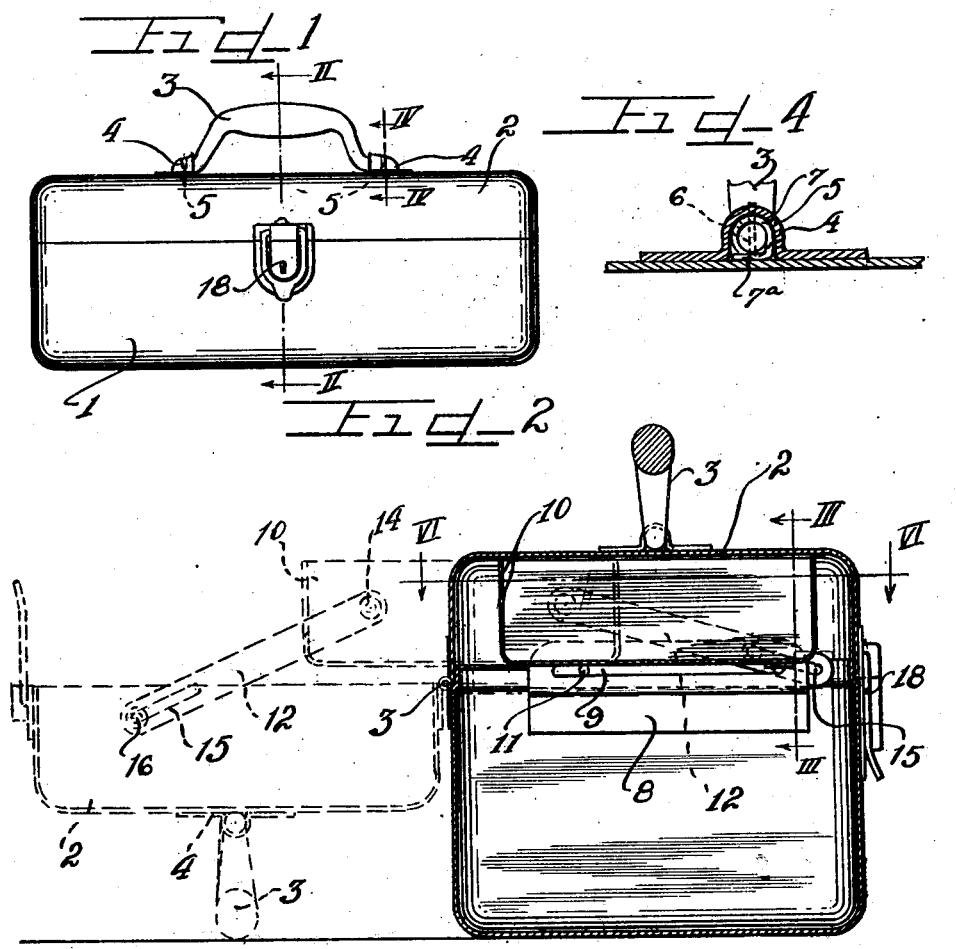
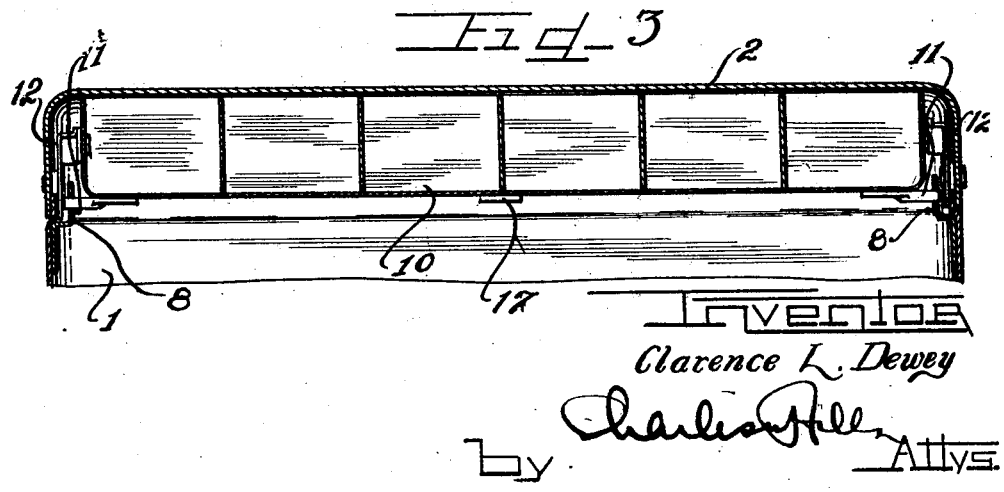
Inventor
Clarence L. Dewey
by Charles Hill Attys.

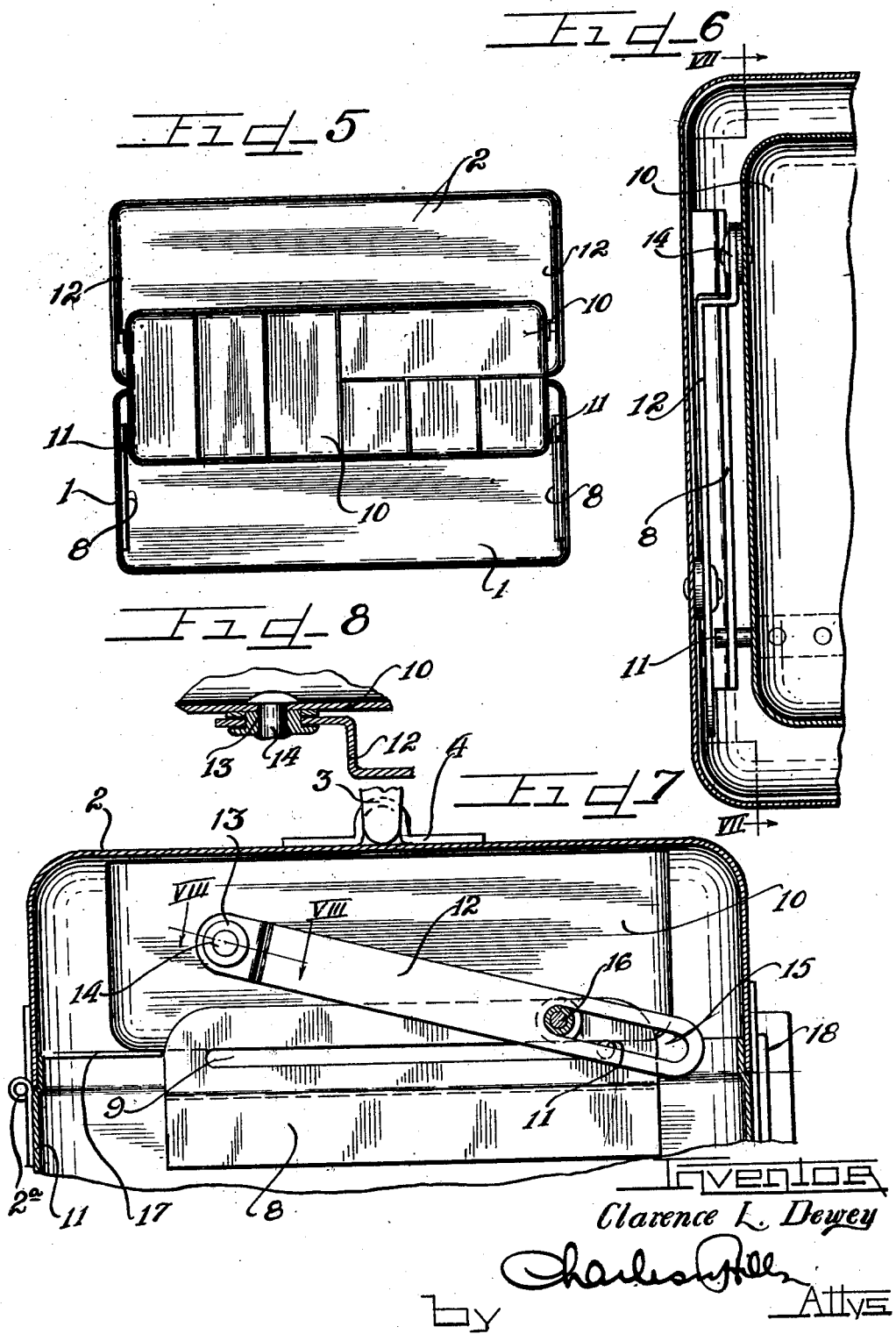

Patented Jan. 27, 1931

1,790,498

UNITED STATES PATENT OFFICE

CLARENCE L. DEWEY, OF ELKHART, INDIANA, ASSIGNOR TO OUTING MANUFACTURING COMPANY, A CORPORATION OF INDIANA

TACKLE BOX

Application filed August 27, 1927. Serial No. 215,800.

This invention relates to a tackle box of that type in which a tray is projected over the rear wall of the body of the box when the tray is open and primarily concerns itself with means for only projecting the tray partially beyond the rear wall of the box and in so constructing the handle on the cover that it will support the cover in its open position. The secondary features and characteristics of the invention will be pointed out as the description proceeds.

The invention comprises the novel structure and combination of parts hereinafter described and more particularly pointed out and defined in the appended claims.

In the accompanying drawings which illustrate a preferred embodiment of this invention and in which similar reference numerals refer to similar features in the different views:

Figure 1 is a front elevational view of a tackle box involving this invention.

Figure 2 is an enlarged sectional view taken substantially upon the line II—II of Figure 1.

Figure 3 is an enlarged sectional view taken substantially upon the line III—III of Figure 2.

Figure 4 is an enlarged fragmentary detail view taken substantially upon the line IV—IV of Figure 1.

Figure 5 is an interior plan view of the tackle box in open position.

Figure 6 is an enlarged fragmentary sectional view taken substantially upon the line VI—VI of Figure 2.

Figure 7 is an enlarged sectional view taken upon the line VII—VII of Figure 6 with parts shown in elevation.

Figure 8 is an enlarged fragmentary sectional view taken upon the line VIII—VIII of Figure 7.

As shown on the drawings:

As an exemplification of this invention there is shown a tackle box comprising a body portion 1 which is shown as substantially of rectangular formation and a cover member 2 which is hinged to the rear wall of the box as indicated at 2a. The cover member 2 is provided with a rigid handle 3, the lower ends of which project under suitable keepers or caps 4. The keepers or caps 4 are suitably slotted as indicated at 5 which slots extend substantially from the top down one side of the cap to a point substantially at the bottom thereof. The enclosed trunnion portions of the handle 3 are provided with pins 6 which project through the slots 5, the upper ends of the slots 5 forming shoulders for limiting the movement of the pins and the handle to a vertical position. A spring 7 having one end secured to a trunnion of the handle and wound around such trunnion with its outer end 7a lying flat against the top of the cover as shown in Figure 4 normally holds the handle in a vertical upright position. However, the handle may be swung down to lie flat upon the cover when it is desired to crate the tackle box or insert the same under the seat in a boat or the like. It will be appreciated that the slot and pin connection 6 between the handle and the caps 4 allow the handle to be swung downwardly in the direction of the slots.

At the ends of the body portion of the tackle box are tray guides 8. Each tray guide is provided with a longitudinal slot 9. A tray 10 normally within the body portion of the box is provided with trunnions 11 at its lower forward end, which trunnions extend through the slots 9 in the guides. A pair of links 12 are pivoted to the ends of the tray, one at each end. The pivotal connection of the link with the tray is shown in Figure 8 and in referring to such figure it will be noted that each link has an aperture for receiving a washer or bushing 13 through which an attaching pivot 14 extends for connecting the link to the tray. The ends of the links 12 opposite to the pivots 14 are slotted as indicated at 15 and suitable pivots or trunnions 16 on the cover extend through the slots in the links 12. It might be mentioned that the pivot studs 16 are substantially similar to the pivot studs 13 and 14.

When the tackle box is in closed position, one side of the tray will be supported by the slotted guides 8 and in order to support the other side of the tray, suitable ledges 17 (Figure 7) may be secured to the body portion at the rear part of the tray for the purpose of supporting the rear part of the tray.

In the present instance a lock 18 has been shown as applied on the tackle box to lock the cover in its closed position.

In using this tackle box it will be obvious that as the cover is swung into its open position as shown in dotted lines in Figure 2, the links 12 will partially project the tray 10 over the rear wall of the box as indicated in dotted lines in Figure 2 so that when the cover is in open position, the tray will be supported half way beyond the rear wall of the box as shown in Figure 5. When the cover is in its fully open position as shown in Figure 2, the handle 3 will rest upon the floor and support the cover 2 in a horizontal plane; the handle being firmly held in such position by the aforementioned springs 7. The cover may be closed by merely sliding the tray back into the body portion or the cover may be manually raised according to the method that is most convenient.

It will be noted that in its open position the tray is supported upon the upper edge of the rear wall of the body portion and by the trunnions 11 and guides 8 whereby the tray is firmly supported in its open position. It will also be noted that when the tackle box is open, the tray 10 is projected sufficiently beyond the rear wall of the tray to provide proper access to the body portion of the tackle box. It will also be appreciated that in providing a rigid handle that is normally held in its vertical position, a substantial prop is provided for supporting the cover in its open position, thereby imparting greatest stability to the tackle box in its open position so that it cannot be readily tipped over. Further, the provision whereby the handle 3 may be swung to a position flat against the cover, it is possible to slide the tackle box under the seat of a boat, cupboard, or the like.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a tackle box, a body portion, a tray slidably supported by said body portion, a cover hinged to said body portion, a connection between said cover and tray for partially projecting said tray over the rear wall of said box when said cover is opened, a swingable handle on said cover and means for retaining said handle at an angle to said cover for supporting the same in open position.

2. In a tackle box, a body portion having slotted guides, a tray having trunnions engageable with said slotted guides, a cover hinged to the rear wall of said box, a connection between said cover and tray for partially projecting said tray over the rear wall of said body portion when said cover is opened and a swingable handle on said cover having a fixed relation therewith for supporting said cover in open position.

3. In a tackle box, a body portion, a tray slidably supported in said body portion, a cover hinged to the rear wall of said tray, a connection between said cover and tray for partially projecting said tray beyond the rear wall of said body portion when the cover is open, a swingable handle on said cover and means for maintaining said handle at a predetermined angle with respect to said cover for supporting said cover in its open position.

4. In a tackle box, a body portion having end guides, a tray having trunnions slidably engaging said guides, links connecting said cover and tray for partially projecting said tray over the rear wall of said body portion when said cover is opened, a handle on said cover and resilient means for holding said handle at right angles to said cover for supporting the same in horizontal open position.

5. In a tackle box, a body portion, a cover hinged to said body portion, slotted keepers upon said cover, a handle having trunnions engaging beneath said keepers, a pin in each trunnion operating in a slot, and resilient means for urging said pins toward the ends of said slots.

In testimony whereof I have hereunto subscribed my name at Elkhart, Elkhart County, Indiana.

CLARENCE L. DEWEY.